United States Patent
Harvey

(10) Patent No.: US 12,041,030 B2
(45) Date of Patent: *Jul. 16, 2024

(54) DISTRIBUTED MEMORY DATA REPOSITORY BASED DEFENSE SYSTEM

(71) Applicant: ROYAL BANK OF CANADA, Toronto (CA)

(72) Inventor: Stéphane Harvey, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,029

(22) Filed: Apr. 20, 2022

(65) Prior Publication Data

US 2022/0247717 A1     Aug. 4, 2022

Related U.S. Application Data

(63) Continuation of application No. 15/964,682, filed on Apr. 27, 2018, now Pat. No. 11,316,829.

(Continued)

(51) Int. Cl.
| | |
|---|---|
| *H04L 9/40* | (2022.01) |
| *H04L 67/1097* | (2022.01) |
| *H04W 12/062* | (2021.01) |
| *H04L 67/1001* | (2022.01) |
| *H04L 67/1095* | (2022.01) |
| *H04L 69/324* | (2022.01) |

(52) U.S. Cl.
CPC ............ *H04L 63/02* (2013.01); *H04L 63/083* (2013.01); *H04L 63/123* (2013.01); *H04L 63/1416* (2013.01); *H04L 67/1097* (2013.01); *H04W 12/062* (2021.01); *H04L 67/1001* (2022.05); *H04L 67/1095* (2013.01); *H04L 69/324* (2013.01)

(58) Field of Classification Search
CPC ..... H04L 63/02; H04L 63/083; H04L 63/123; H04L 63/1416; H04L 67/1097; H04L 67/1001; H04L 67/1095; H04L 69/324; H04W 12/062
See application file for complete search history.

(56) References Cited

U.S. PATENT DOCUMENTS

| | | | |
|---|---|---|---|
| 7,774,572 B2 * | 8/2010 | Yokohata .............. | G06F 3/0647 711/171 |
| 7,797,406 B2 | 9/2010 | Patel et al. | |

(Continued)

OTHER PUBLICATIONS

WIPO, International Search Report and Written Opinion for International Application No. PCT/CA2018/050497 dated Jul. 11, 2018.

*Primary Examiner* — Philip J Chea
*Assistant Examiner* — Sangseok Park
(74) *Attorney, Agent, or Firm* — Norton Rose Fulbright Canada LLP

(57) ABSTRACT

A distributed memory data repository of connected data centres. The network load balances by routing requests to different data centres for processing. The solution design provides a blue print to implement a distributed memory data repository based defense system across multiple nodes with dynamic fail-over capabilities. The defense system runs independently on a single node, exclusively leveraging memory for data storage and implementing a communication channel to interact with other nodes.

24 Claims, 7 Drawing Sheets

Related U.S. Application Data

(60) Provisional application No. 62/502,121, filed on May 5, 2017.

(56) References Cited

U.S. PATENT DOCUMENTS

| | | | | |
|---|---|---|---|---|
| 8,315,977 | B2 * | 11/2012 | Anand | G11B 27/002 |
| | | | | 707/610 |
| 8,732,267 | B2 * | 5/2014 | Banerjee | G06F 9/5072 |
| | | | | 709/217 |
| 8,813,174 | B1 * | 8/2014 | Koeten | H04L 67/10 |
| | | | | 713/168 |
| 10,372,926 | B1 | 8/2019 | Leshinsky et al. | |
| 2007/0113187 | A1 * | 5/2007 | McMullen | G06F 21/6218 |
| | | | | 715/742 |
| 2010/0088698 | A1 | 4/2010 | Krishnamurthy | |
| 2011/0010544 | A1 * | 1/2011 | Inaba | H04L 9/3271 |
| | | | | 713/168 |
| 2011/0219451 | A1 * | 9/2011 | McDougal | G06F 21/562 |
| | | | | 726/23 |
| 2011/0289508 | A1 | 11/2011 | Fell et al. | |
| 2013/0276070 | A1 | 10/2013 | Lee | |
| 2014/0289202 | A1 | 9/2014 | Chan et al. | |
| 2016/0036837 | A1 * | 2/2016 | Jain | H04L 63/1416 |
| | | | | 726/23 |
| 2016/0092308 | A1 * | 3/2016 | Bates | G06F 11/1092 |
| | | | | 714/4.11 |
| 2017/0171190 | A1 * | 6/2017 | Lee | G06F 21/31 |
| 2018/0139269 | A1 * | 5/2018 | Wu | H04L 45/306 |
| 2020/0014747 | A1 * | 1/2020 | Rostami | H04L 67/101 |

\* cited by examiner

DISTRIBUTED MEMORY DATA REPOSITORY BASED DEFENSE SYSTEM

FIELD

Embodiments generally relate to the field of distributed data centres.

INTRODUCTION

An organization can use data centres or data repositories to manage and store data. A data center is a facility used to house computer systems and associated components, such as telecommunication and storage components. An organization can use a distributed network of data centres to manage and store data. Data centres can use distributed memory to manage and store data, for example. Distributed memory can refer to a multiprocessor computer system or multi-computer system in which each processor or computer has its own associated private memory.

SUMMARY

In accordance with an aspect, there is provided a distributed memory data repository with a network of a plurality of data centres and a repository switch, the repository switch for routing a first data request to a first data centre of the plurality of data centres for verification, the first data centre comprising a node, a processor, a switch and a memory, the switch for routing the first data request to the node, the memory having a data repository, the processor configured to execute machine readable instructions stored in the memory to control the node to verify the first data request using the data repository and, upon verification, execute the first data request.

In some embodiments, the repository switch is configured for load balancing to select the first data centre from the plurality of data centres using load data for the plurality of data centres.

In some embodiments, the first data request has access credentials, wherein the node verifies the first data request by processing the access credentials using stored access credentials at the memory.

In some embodiments, upon the access credentials not being verified at the first data centre, the repository switch is configured to re-route the first data request to a second data centre of the plurality of data centres for verification using other stored access credentials at the second data centre.

In some embodiments, the repository switch is configured to route a second data request to a second data centre of the plurality of data centres for verification, the second data centre comprising a node, a processor, a switch and a memory, the switch for routing the first data request to the node, the memory having a data repository, the processor configured to execute machine readable instructions stored in the memory to control the node to verify the second data request using the data repository and, upon verification, execute the second data request.

In some embodiments, upon verification of the first data request by the first data centre, the repository switch is configured to route data traffic to the first data centre for storage and processing.

In some embodiments, the first data centre is configured to route the data traffic to a second data centre for storage and processing.

In some embodiments, the processor of the first data centre is configured to transmit a synchronization request to the repository switch to update the data repository with data stored at the plurality of data centres.

In some embodiments, the repository switch is configured to transmit synchronization requests to the plurality of data centres to update the data repository with data stored at the plurality of data centres.

In some embodiments, the repository switch is configured with rules for processing network traffic for routing to the first data centre.

In some embodiments, the repository switch is configured to receive updated data and systematically distributed the updated data to the plurality of data centres.

In some embodiments, the repository switch is configured to receive a repository deficiency notification from a requesting data centre, and route the repository deficiency notification to the first data centre to trigger a fail-safe mode for the requesting data centre.

In some embodiments, the repository switch is configured to systematically detect repository deficiencies of any of the plurality of data centres and delegate a defense process to another data centre for a requesting data centre, the defense process to systematically enter a fail-safe allow all mode it response to the detected repository deficiencies.

In some embodiments, the processor is configured to control the node to implement packet inspection for a fast evolving attack pattern, and share packet inspection notifications across the plurality of data centres for global protection.

In some embodiments, the repository switch is configured to enable an administrator device to enable and disable a defense system rapidly across all nodes.

In some embodiments, the repository switch is configured to implement a monitoring only mode by which all detective and self-capability features are active and a defense blocking mode is not operational.

In some embodiments, the repository switch is configured to route the first data request to the first data centre using a sequence of data centres.

In some embodiments, the first data centre is configured to transmit a data restoration request to the repository switch, the repository switch being configured to route the data restoration request to a second data centre, the second data centre being configured to transmit data to the first data centre in response to restore the data repository.

In accordance with an aspect, there is provided a process for a distributed memory data repository with a network of a plurality of data centres and a repository switch. The process involves: load balancing, using the repository switch, to select a first data centre from the plurality of data centres using load data for the plurality of data centres; routing, using the repository switch, a first data request to the first data centre of the plurality of data centres for verification, the first data request comprising access credentials, the first data centre comprising a node, a processor, a switch and a memory having a data repository; routing the first data request to the node using the switch; controlling the node using the processor to verify the first data request by processing the access credentials using stored access credentials at the data repository of the memory; upon verification, executing the first data request using the processor.

In some embodiments, the process involves upon the access credentials not being verified at the first data centre, re-routing, using the repository switch, the first data request to a second data centre of the plurality of data centres for verification using other stored access credentials at the second data centre.

In accordance with an aspect, there is provided a process for a distributed memory data repository with a network of a plurality of data centres and a repository switch. The process involves: load balancing, using the repository switch, to select a first data centre from the plurality of data centres using load data for the plurality of data centres; routing, using the repository switch, a first data request to the first data centre of the plurality of data centres for verification, the first data centre comprising a node, a processor, a switch and a memory having a data repository; routing the first data request to the node using the switch; controlling the node using the processor to verify the first data request using stored data at the data repository of the memory; upon verification of the first data request by the first data centre, routing data traffic, using the repository switch, to the first data centre for storage and processing.

In accordance with an aspect, there is provided a distributed memory data repository with load balancing for request processing. The request can include a credential for verification across nodes of the distributed memory data repository.

In accordance with an aspect, there is provided a distributed memory data repository with a network of data centres and a switch, the switch for routing requests to a data centre for verification.

In accordance with an aspect, there is provided a distributed memory data repository that is synchronized between all nodes.

In accordance with an aspect, there is provided a distributed memory data repository with rules by which network traffic is analyzed and the associated node data repository is systematically updated, once an update is available, the update is systematically distributed to all other nodes.

In accordance with an aspect, there is provided a distributed memory data repository that can systematically detect any repository deficiencies and delegate defense analysis to another node of the distributed memory data repository to the requesting node. The defense system can systematically enter a fail-safe allow all mode if all nodes report repository deficiencies.

In accordance with an aspect, there is provided a distributed memory data repository with packet inspection for fast evolving attack patterns, wherein the inspection is performed at a node level and shared across all other nodes for global protection.

In accordance with an aspect, there is provided a distributed memory data repository with a switch that enables an administrator device to disable the defense system rapidly across all nodes.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures.

DETAILED DESCRIPTION

Figure 1:
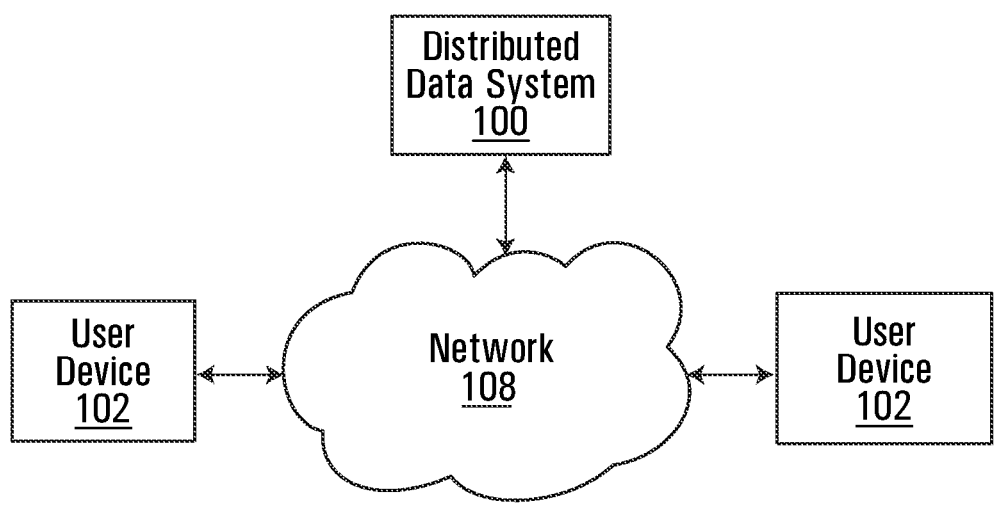
FIG. 1 is a schematic of an example distributed data system.

FIG. 1 is a schematic of an example distributed data system 100 configured to distribute data traffic. Data system 100 connects to user device(s) 102 over network 108. Data traffic includes data sent and received by distributed data system 100 and user device 102. A user device 102 can send a data request to the distributed data system 100 to access data, for example. The request can be an authentication request, including credentials such as a username or password. This is an example request and other types of requests can be processed by distributed data system 100. Data system 100 can include telecommunications and storage components. The distributed data system 100 includes processors that connect to other components in various ways including directly coupled and indirectly coupled via the network 108. Network 108 (or multiple networks) is capable of carrying data and can involve wired connections, wireless connections, or a combination thereof. Network 108 may involve different network communication technologies, standards and protocols. The distributed data system 100 provides a distributed memory data repository. Data system 100 is a distributed network of nodes, each node having an associated computing device.

Figure 2:
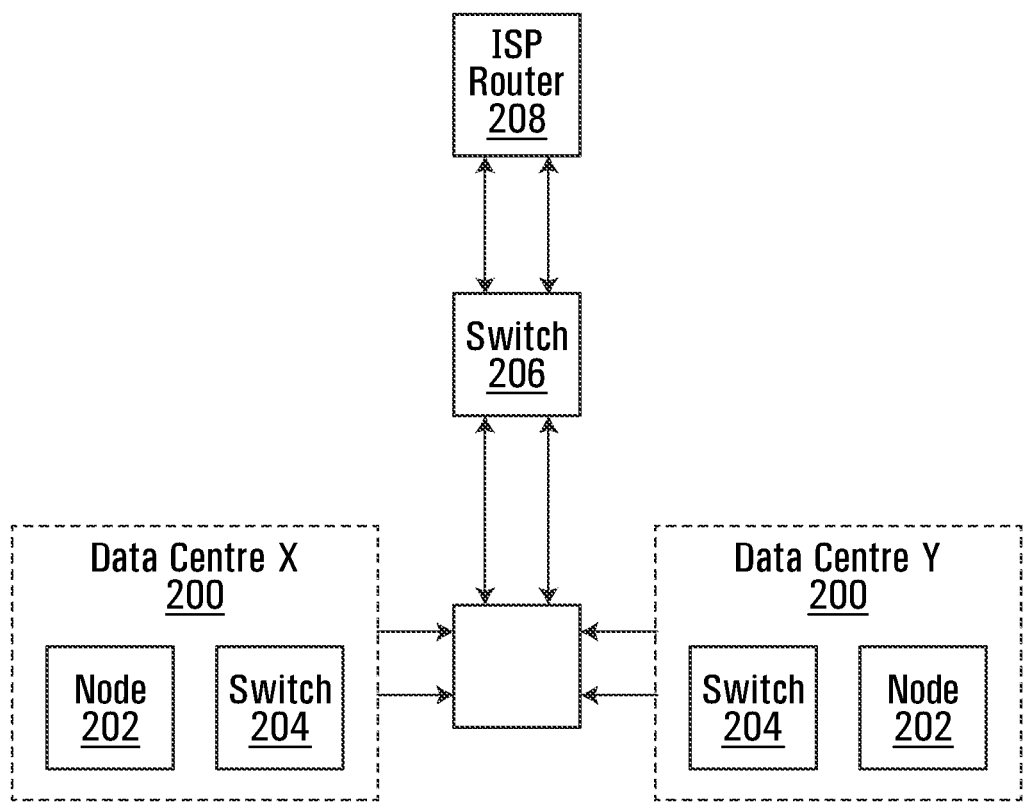
FIG. 2 is a schematic of distributed data centres according to some embodiments.

FIG. 2 is a schematic of distributed data centres 200 according to some embodiments. The data centres 200 can form part of the distributed data system 100. Each data centre 200 can have a computer network of nodes 202 and switches 204 to manage and store data. Each data centre 200 can provide a memory data repository of the distributed memory data repository. For example, a node 202 can include a memory data repository. Each data centre 200 can handle requests for data access, for example. The request can include access credentials that can be verified by the distributed memory data repository. The nodes 202 can be physical or virtual nodes 202. A node 202 can be a client or server, for example. The data centres 200 provide a distributed memory data repository. Each data centre 200 can have a local memory data repository. The memory data repository can be synchronized between all nodes 202.

Data centre 200 includes at least one node 202 and a switch 204. The data centre 200 can include multiple nodes 202. In an example embodiments, data requests or data traffic arrives at Internet Service Provider (ISP) Router 108 and a repository switch 206. The data requests or data traffic by the switch 206 are routed to a data centre 200 for load balancing. The switch 206 can use load data about the data centres to select a data centre as part of the routing process.

Additional hardware can connect the switch 206 to the data centre 200. There can be many requests for data at data centres 200 so even the request communications are routed by switch 206 for load balancing.

Data centre 200 can integrate the node 202 and the switch 204 with one or more firewalls such as for example, as described in U.S. patent application Ser. No. 15/897,670 files Feb. 15, 2017 which is incorporated by reference.

Internet traffic comes into a data centre 200 via ISP Router 108 and switch 206. The data centre 200 can handle requests and identify malicious requests by verifying an aspect of the request, such as a credential or identifier (e.g. a user name). The request can be a login request, for example. The data centre 200 or node 202 may perform such verification as a form of pre-authentication validation prior to a subsequent authentication by the data centre 200 or another networked computer system, component, or resource. In such embodiments, the node 202 might only route the request to the subsequent computer resource (or another node 202 or data centre 200) once the node 202 has determined the request (e.g. the request's credential) to be valid or the request has been verified. By performing a pre-authentication validation of the request, the data centre 200 is able to offload at least some validation of the request from another networked computing resource, to attempt to ensure that only validated or verified requests reach that computing resource thereby reducing the number of invalid requests from reaching that computing resource. Accordingly, embodiments described herein may provide a pre-authentication validation mechanism for received credentials, which may be further used for client profiling, analytics of request distribution, or for other purposes.

Figure 3:
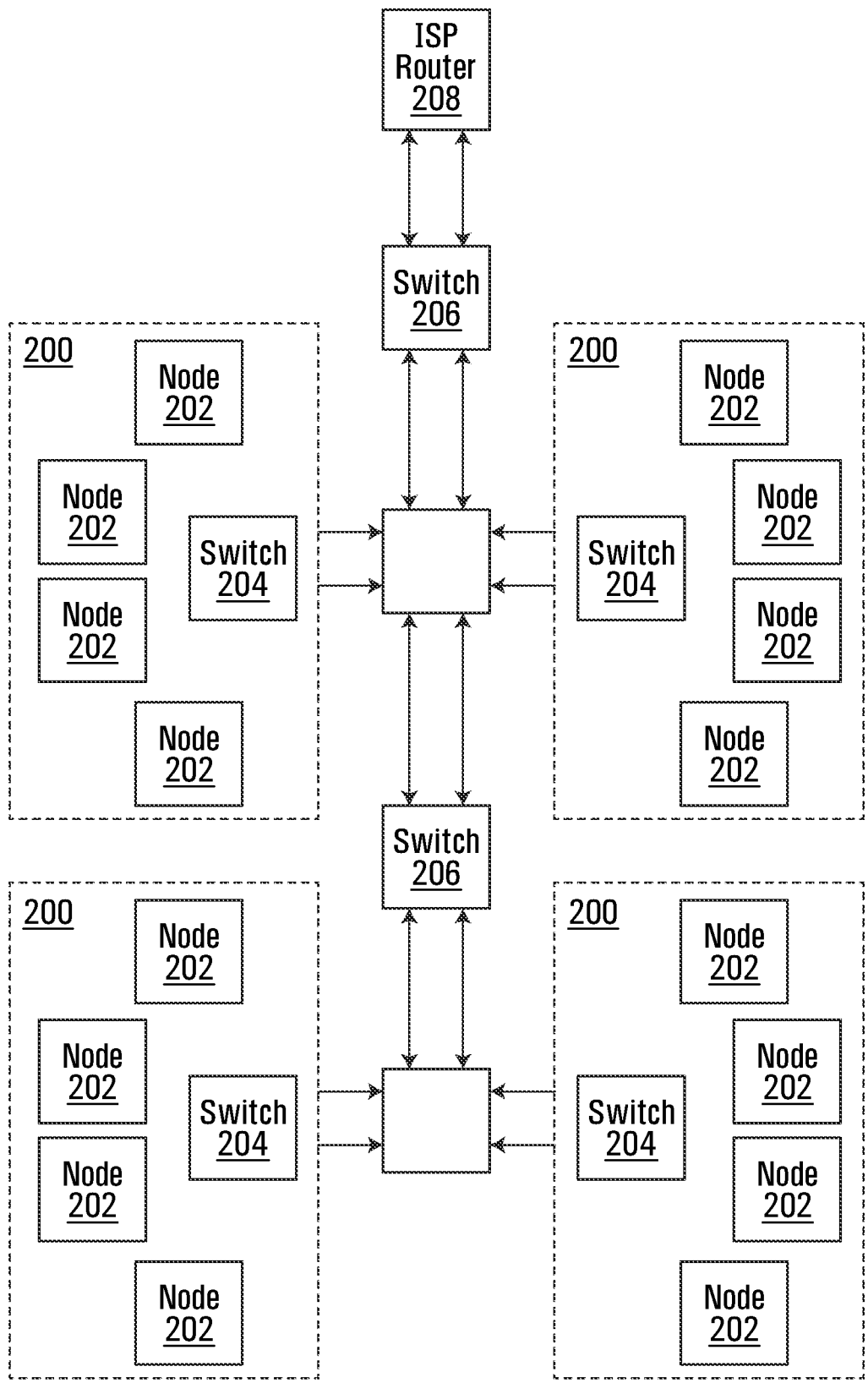
FIG. 3 is a schematic of distributed data centres according to some embodiments.

FIG. 3 is another schematic of distributed data centres 200 according to some embodiments. There may be multiple ISP Routers 108 and repository switches 206 connecting data centres 200. A data centre 200 can include multiple nodes 202 connected by one or more switches 204. The switch 204 can route requests to a node 202. The repository switches 206 can route requests and data traffic to data centres 200.

The distributed data centres 200 can implement a distributed memory data repository based defense system across multiple nodes 202 with dynamic fail-over capabilities. The defense system can run independently on a single node 202, leveraging memory for data storage and implementing a communication channel to interact with other nodes 202.

The nodes 202 include hardware components (virtualized or real) that can execute code and support dynamic memory allocation. Examples include appliances and computers (with processor and memory storing machine executable instructions). Each node 202 can have a network address that can be recorded in a data structure or repository (e.g. table, book) record which itself can be distributed across all nodes 202. The mutual authentication of each node 202 can vary based on the network configuration and the security requirements. The data centres 200 and nodes 200 can provide a defense system with the following example specifications and capabilities: distributed data repository; self-maintaining; self-aware; and self-healing. Some embodiments use a detective and protective process for request verification.

Internet traffic is routed by switch 206 to different data centres 200 for load balancing (and not overloading one data centre 200 over another data centre 200) using load data or usage data. The switch 206 can manage current loads to data centres 200 in order to route to different data centres 200 for load balancing of requests.

Figure 4:
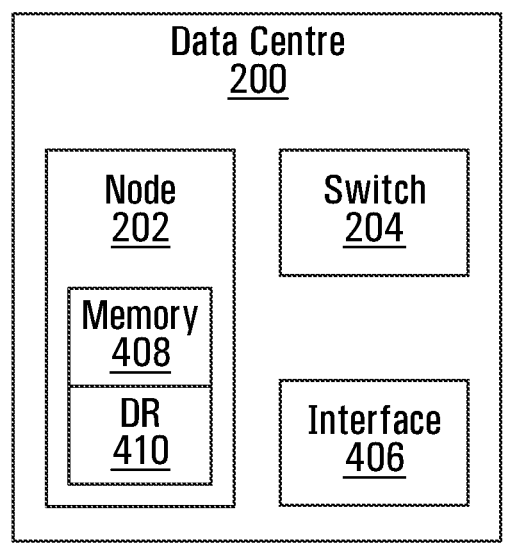
FIG. 4 is a schematic of a distributed data centre according to some embodiments.

FIG. 4 provides an example schematic of a data centre 200. The data centre 200 has a node 202 with at least one memory 408 storing a data repository 410, such as, for example a database or other data structure. The data centre 200 has a switch 204 and an interface 406.

The data centre 200 forms part of a distributed memory data repository with a network data centres 200 and a repository switch 206. The repository switch 206 routes a data request to the data centre 200 for verification. The data centre 200 has a switch 294 for routing the data request to the node 202. The data centre 200 has a processor (e.g. at node 202) configured to execute machine readable instructions stored in the memory 408 to control the node 202 to verify the data request using the data repository 410. Upon verification, the processor (or node 202 more generally) executes the data request and/or sends a verification response to the switch 204 for provision to the repository switch 206. The interface 406 can communicate with an administrator device to enable or disable a defense system in response to receiving control commands.

Figure 5:
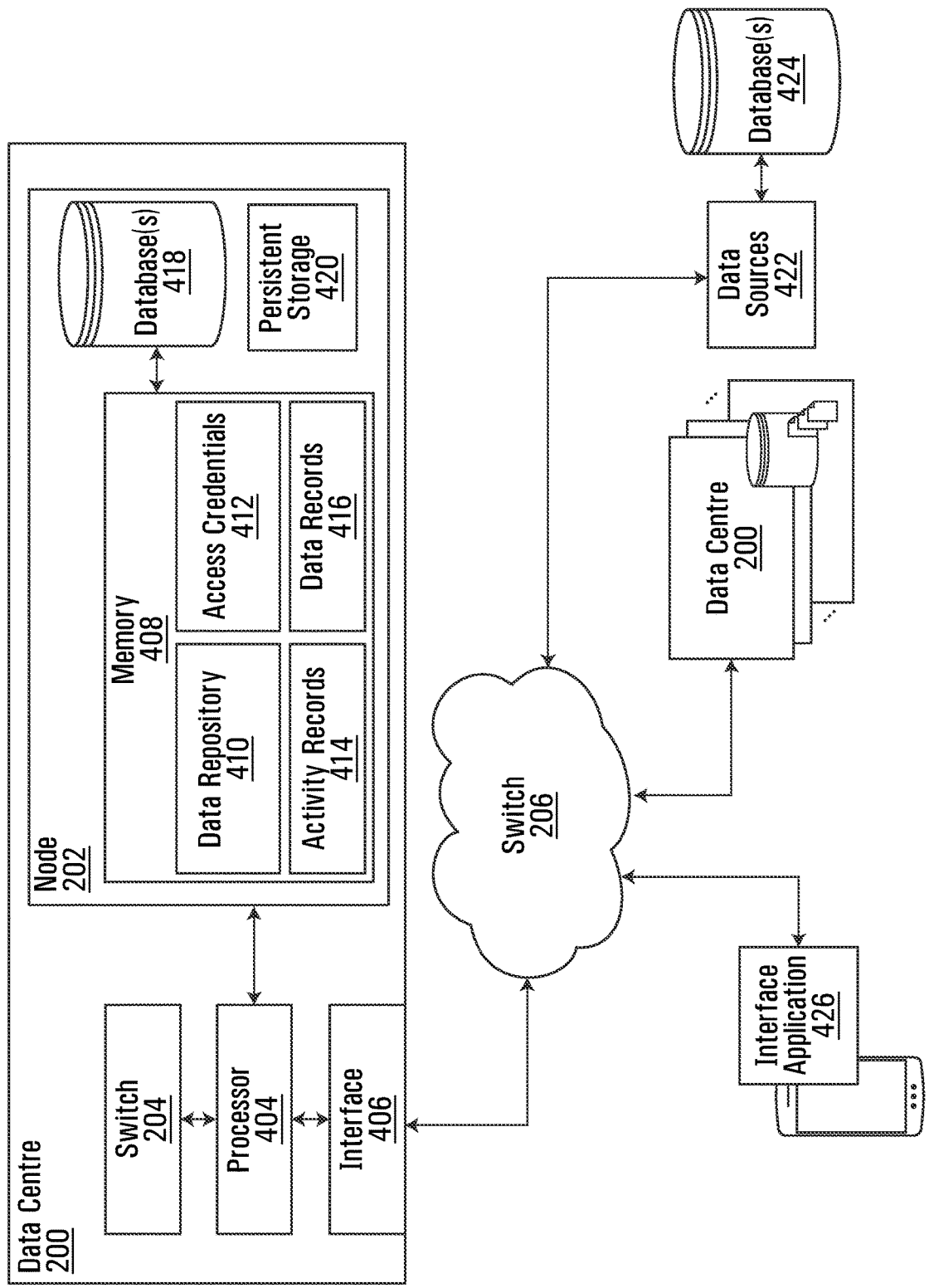
FIG. 5 is a schematic of a distributed data centre according to some embodiments.

FIG. 5 provides another example schematic of a data centre 200. The data centre has a processor configured to execute machine readable instructions stored in memory 408 to control node 202. In some embodiments, node 202 can include the processor 404 has an integrated component. The memory stores the data repository 410 of data, rules or parameters stored as access credentials 410, activity records 414, and data records 416. The data centre 200 communicates via switch 206 with other data centres 200 and data sources 422 (including databases 424). The node 202 can also include databases 418 and persistent storage 420. The data centre 200 can connect with an interface application 426 to configure parameters for access credentials 410, updates or synchronization rules, load balancing rules, recovery rules, and so on. Although only one node 202 is shown, the data centre 200 can have multiple nodes in some embodiments. The data centre 200 can route data requests and traffic across its nodes for internal load balancing using its switch 204.

The data centre 200 forms part of a distributed memory data repository with a network data centres 200 and a repository switch 206. The repository switch 206 routes a data request to the data centre 200 for verification. The switch 204 of the data centre 200 routes the data request to the node 202. The memory 408 has a data repository 410 and access credentials 412. The processor 404 is configured to execute machine readable instructions stored in the memory 408 to control the node 202 to verify the data request using the data repository 410 and the access credentials 412. Upon verification, the node 202 can execute the data request. In some embodiments, this may involve retrieving or processing data in memory 408, or may involve receiving data traffic from a requesting device that initially transmitted the data request.

In some embodiments, the repository switch 206 is configured for load balancing to select the data centre 200 from the network of data centres 200 using load data indicating current usage of the data centres 200. This load balancing by repository switch 206 enables data requests to be shared among the data centres 200 so that processing is not limited to only a subset of data centres and the distributed repository can leverage and optimize usage of the data centres. The repository switch 206 can collect load data in real-time to ensure it reflects current usage. The load balancing can apply to the requests and the data traffic, for example, to ensure distribution of requests and data traffic across the network of data centres 200. The repository switch 206 is configured to route data requests to other data centres 200 for verification and execution. In some embodiments, the repository switch 206 is configured with rules for processing network traffic for routing to different data centres 200.

In some embodiments, the data request includes access credentials, and the node 202 verifies the data request by processing the access credentials using stored access credentials at the memory 408. In some embodiments, if the access credentials cannot be verified at the first data centre, the repository switch is configured to re-route the first data request to a second data centre of the plurality of data centres for verification using other stored access credentials at the second data centre.

In some embodiments, upon verification of the data request by the data centre 200, the repository switch 206 is configured to route data traffic from the requesting device that initiated the request to the data centre 200 for storage and processing. In some embodiments, the data centre 200 is configured to route the data traffic to another data centre 200 for storage and processing. The data centres 200 can be arranged in different configurations to enable sequencing of routing.

Some data centres 200 may for a back end so that the data centres 200 are arranged in tiers, for example. In some embodiments, the repository switch 206 is configured to route the data request to the data centre 200 using a sequence of data centres 200. The sequence can be stored at a local memory or in a memory 408 of a data centre 200 (or across memories 408 of multiple data centres 200).

In some embodiments, the processor 404 of the data centre 200 is configured to transmit a synchronization request to the repository switch 206 to request an update of its data repository 410 with data stored across the network of data centres 200. The synchronization request may be periodical or ad hoc. In some embodiments, the repository switch 206 is configured to transmit synchronization requests to the data centres 200 to update the data repository 410 with data stored across the network of data centres 200. That is, the repository switch 206 or the data centre 200 can initiate the synchronization request. The repository switch 206 can also relay the synchronization request to other data centres 200. In some embodiments, the repository switch 206 is configured to receive updated data from data centres 200 and systematically distributed the updated data to other data centres 200.

In some embodiments, the repository switch 206 is configured to receive a repository deficiency notification from a requesting data centre 200, and route the repository deficiency notification to the data centre 200 to trigger a fail-safe mode for the requesting data centre 200.

In some embodiments, the repository switch 206 is configured to systematically detect repository deficiencies of any of the plurality of data centres and delegate a defense process to another data centre for a requesting data centre. The defense process systematically enters a fail-safe allow all mode it response to the detected repository deficiencies. For example, in some embodiments, the processor 404 is configured to control the node 202 to implement packet inspection for a fast evolving attack pattern. The node 202 can share packet inspection notifications across the network of data centres 200 for global protection. This can trigger the defense process, for example. In some embodiments, the repository switch 206 is configured to enable an administrator device (e.g. using interface application 426) to enable and disable a defense system rapidly across all nodes 202 of the data centres 200.

In some embodiments, the repository switch 206 is configured to implement a monitoring only mode by which all detective and self-capability features are active and a defense blocking mode is not operational. The repository switch 206 can send control commands to the data centres to implement the detective and self-capability features for traffic inspection, for example.

In some embodiments, the data centre 200 is configured to transmit a data restoration request to the repository switch 206. The repository switch 206 is configured to route the data restoration request to other data centres 200 in the network. The other data centres are configured to transmit data to the requesting data centre 200 in response to restore its data repository 410. This enables backup for restoration across the network of data centres 200. In some embodiments, the node 202 is configured to transmit a data restoration request to another node 202 of the data centre 200. The switch 204 is configured to route the data restoration request to other node 202 in the data centre 200. The other node 202 is configured to transmit data to the requesting node 202 in response to restore its data repository 410. This enables back up or restoration within a data centre.

The node 202 can be configured to maintain an audit record of data requests and data traffic using activity records 414. Activity records 414 can indicate requesting devices, requesting activities, verified requests, unverified requests and so on. The activity records 414 can provide a record of activity at node 202 that can be correlated with activity records 414 across the network of data centres 200 for a comprehensive overview of the activity implemented by the data centres 200. Activity records 414 can be used for cybersecurity to track requests and identify malicious requests or multiple unverified requests from a common requesting device, for example.

The node 202 can be configured to maintain data records 416 of stored network data traffic packets and data requests. The node 202 can use data records 416 to respond to respond to restoration requests received from other nodes 202 or data centres. The collection of data records 416 across all nodes 202 and data centres 200 can provide the data collection for the distributed data repository. Data records 416 can form part of the data repository 410, for example.

Each node 202 may be connected to or include at least one respective memory 408 within which the data repository 410 is stored. In some embodiments, the node 202 may include memory 408 to provide for minimal latency when accessing the data repository 410 in memory 408. The memory 408 can be part of the node 202 itself, rather than a separate storage device at the data centre 200. That is, node 202 can integrate a data storage device. Each node 202 can have its own memory 408, for example. In some embodiments, the node 202 may identify requests that are authentication requests and process requests at the data centre 200 to check or determine if the authentication credential (e.g. login username) is legitimate or verified using the data repository 410 and access credentials in memory 408. Where multiple nodes 202 are present at a data centre 200, each node 202 may maintain its own data repository 410 in its own memory 408. The data repository 410 forms part of the distributed memory data repository 410.

The data repository 410 can use different types of data stores or data structures and is not limited to tables. The data centre 200 verifies data request to filter outside requests to access a service using access credentials 412. Access credentials 412 can include a table of verified or authenticated credential data (e.g. of usernames or other credentials) that can be matched against a requester of the data request in order to verify the data request prior to processing.

In some embodiments, the data centre 200 can load balance requests between data centres 200 ahead in the network chain so that only legitimate requests make it to backend servers or data centres 200 to reduce server workload. As noted, data requests can include credentials to be verified by data repository 410 and access credentials.

The node 202 can execute a preliminary lookup of the user name in the dynamic data repository 410. Data repository 410 may be a lookup table or any other type of data structure. The data repository 410 can implement load balancing across a distributed set of data centres 200. Each data centre 200 can have a data repository 410 that is part of the distributed memory data repository. While each data centre 200 may be intended to have a complete data record of all data, but there may be instances where each data centre 200 may not have a complete up to date record of all data at a given time point. In such embodiments, the data centre 200 (and its data repository 410) can require synchronization of data across the network of data centres 200. A request is routed to a data centre 200 to perform verification by one node 202 using its local data repository 410. If the credential(s) included with the request are not in local data repository 410 then the data centre 200 can send the request to the switch 204 to be re-routed to another node 202, which may be located at another data centre 200, for verification by its local data repository 410. The network may provide a distributed data repository 410 of credentials across data centres 200. The switches 204 can route the requests in sequence to data centres 200 to find the credential in a data repository 410. While some data records may need to be sourced from other nodes 202 and other data centres 200 for various reasons, each node 202 may be intended to maintain a complete reproduction of all data records at all times.

The nodes 202 and data centres 200 provide redundancy and back up for healing to restore its data. A node 202 and data centre 200 can be restored by receiving data from another node 202, which may be located at another data centre 200.

The request with credentials (e.g. username and login) is an example request. Embodiments can be applicable to other use cases where a request needs to be responded to with lookups for data in memory 408 (e.g. using data records 416) as another example. Other types of security verifications or data analysis may be possible with embodiments described herein using activity records 414, data records 416, and so on. In some embodiments, the memory 408 can be fast volatile memory to quickly check if the data needed for a response is generally stored in the local data centre 200. There can be many requests for access to distributed memory 408 at a given time so the requests can be routed to various nodes 202 (or data centres 200) to load balance by switch 204 and/or repository switch 206.

The following provides an overview of example features of embodiments described herein.

Embodiments provide a distributed data repositories 410 across multiple data centres 200 or nodes 202 connected by switch 204 and/or repository switch 206. The distributed data repositories 410 can provide a distributed defense system with restoration support and fail safe mode activation, for example. Data to support the distributed defense system can be stored in memory 408 distributed across data centres 200. Storing data in memory 408 can enable deployment of restoration support across the distributed data centres 200. The memory 408 architecture does not increase network latency associated with a centralized permanent data repository, for example, as requests are load balanced across the network. The data repository 410 of memory 408 is synchronized between all nodes 202 and data centres 200 in some embodiments.

Embodiments can provide a self-maintaining distributed data repository. The defense system (and data centres 200) can execute rules by which network traffic is analyzed and the associated node 202 and data repository 410 is systematically updated. Once an update is available, the defense system can systematically distribute the update to all other nodes 202.

Embodiments can provide self-aware distributed data repository. The defense system can systematically detect repository deficiencies across the network of nodes 202 and delegate defense analysis to another node 202. The nodes can implement the defense system to be self-aware of deficiencies and propagate requests or notifications to other nodes 202. The delegated node 202 can provide back the result of the analysis to the requesting node 202. The defense system can systematically enter a fail-safe allow all mode if all nodes 202 report repository deficiencies.

Embodiments can provide a self-healing distributed data repository. The processor 404 controls the node 202 to trigger the defense system and can systematically start rebuilding and completing the memory repository 410 content by sending requests to other nodes 202 via switch 204 and/or repository switch 206. The rebuild can be operated as traffic analysis occurs (throttled) or on a separate thread and bulk mode.

Embodiments of the node 202 can implement detective and protective processes to support the delivery of simple to complex defense mechanisms. For example, processor 404 controls the node 202 to implement packet inspection on received data packets from network traffic for fast evolving attack pattern detection. The detection results can be propagated to other nodes 202 or data centres 200. The analysis is performed at a node 202 level and the results and conclusion can be rapidly shared across all other nodes 202 for global protection.

Embodiments of the data centre 200 can have a logical power switch (e.g. switch 204). This configuration switch can enable an administrator (user device 102 and interface 206, or interface application 426) to disable the defense system rapidly across all nodes 202 and data centres 200.

Embodiments of the data centre 200 can have a simulation switch (e.g. switch 204). This configuration switch can enable monitoring only mode by which all detective and self-capability features are active, but the defense system (blocking mode) may not be operational.

Embodiments of the data centre 200 or node 202 can operate as part of a firewall. Other embodiments of the data centre 200 or node 202 can also be separate from a firewall or before or after the filtering of the firewall. The firewall (a combination of hardware and software) is configured to filter inbound and outbound network traffic to monitor for activity including malicious activity.

Figure 6:
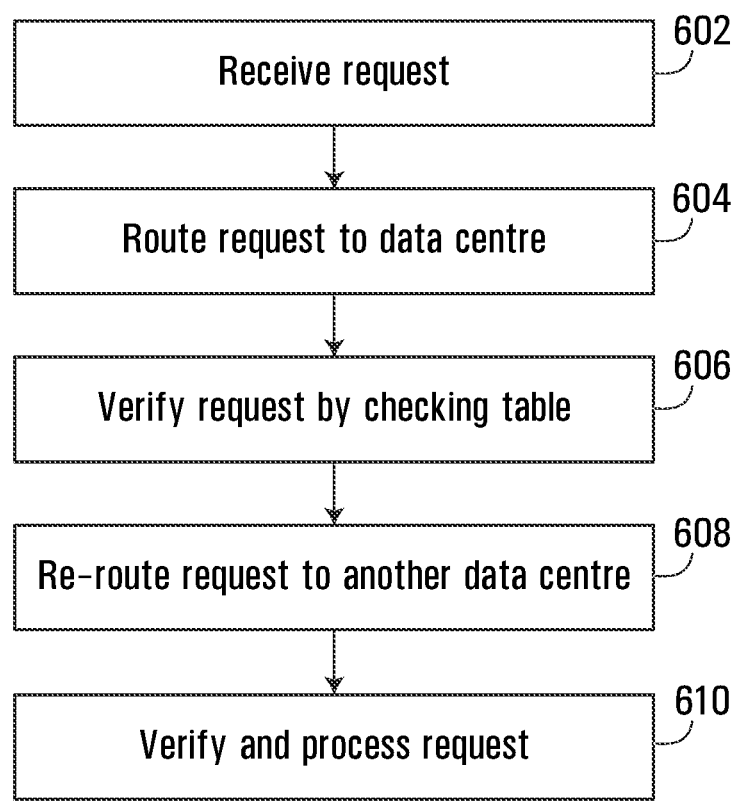
FIG. 6 is a flowchart of method for distributed data centres according to some embodiments.

FIG. 6 is a flowchart of a method for a distributed memory data repository according to some embodiments. The distributed memory data repository has a network of a plurality of data centres and a repository switch. At 602, the repository switch 206 receives a request (which may be referred to as a data request). The request can include access credentials. At 604, the repository switch 206 routes the request to a node 202 at a data centre 200. The process can involve load balancing, using the repository switch 206, to select a first data centre 200 from the plurality of data centres 200 using load data for the plurality of data centres 200. The load data may be in real-time to provide an overview of current usage of the plurality of data centres 200. The repository switch 206 can select the first data centre 200 based on having low usage data compared to other data centres 200 to balance processing across the network of data centres 200.

The switch 204 routes the request to the node 202. At 606, the node 202 verifies the request (and the credentials therein) by checking data repository 410 and stored access credentials 412. If the credentials are not verified by the local data repository 410, then, at 608, the node 202 directs the switch 204 to reroute the request to another node 202, which may be at another data centre 200 (and may involve re-routing by the repository switch 206). At 610, the other node 202 receives and processes the request using its local data repository 410 and processor 404.

In some embodiments, the access credentials are not able to be verified at the first data centre 200, and the process may involve re-routing, using the repository switch 206, the request to another data centre 200 for verification using other access credentials 412 stored locally at the other data centre 200. This may enable a distributed memory of access credentials as not all data centres 200 store the same access credentials in some embodiments.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may [note to draftsperson: consider describing example technical effects and solutions e.g. better memory usage, improved processing, improved bandwidth usage.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Figure 7:
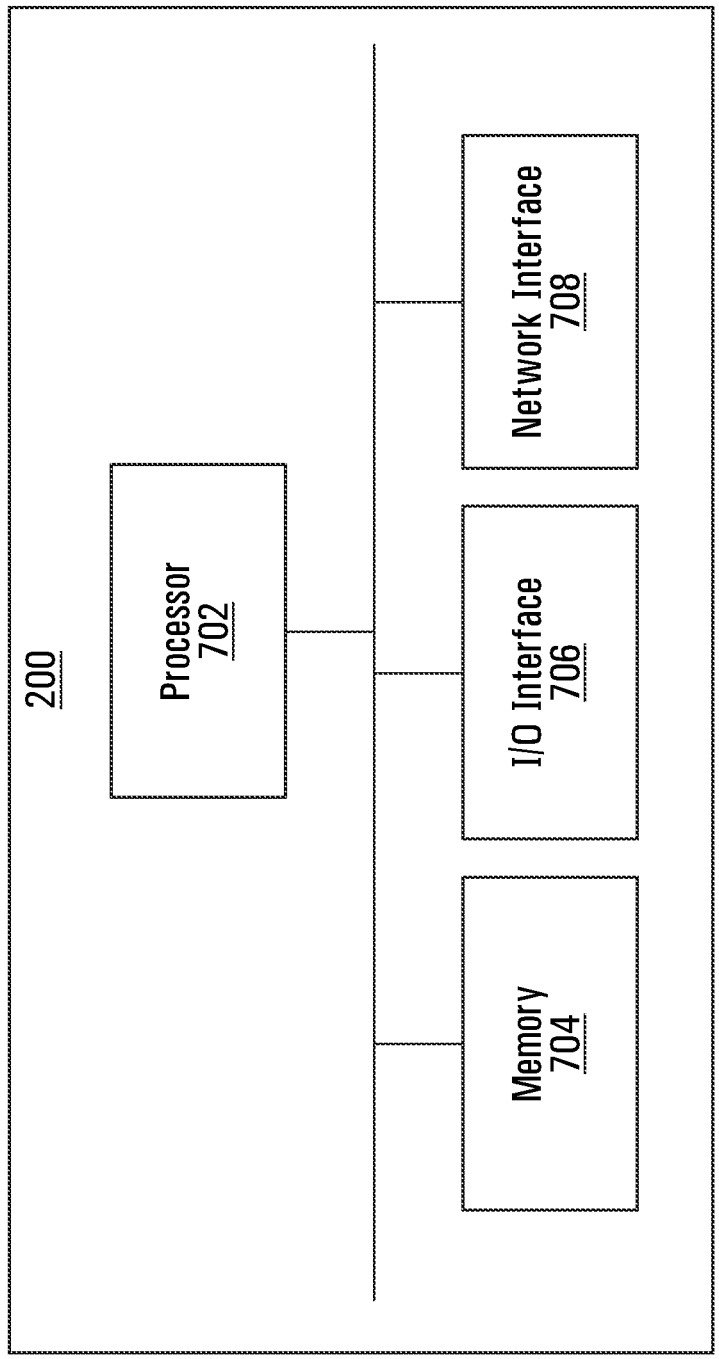
FIG. 7 is a schematic of a distributed memory data repository according to some embodiments.

FIG. 7 is a schematic of a data centre 200 according to some embodiments. As depicted, data centre 200 includes at least one processor 702, memory 704, at least one I/O interface 706, and at least one network interface 708.

Each processor 702 may be, for example, any type of general-purpose microprocessor or microcontroller, a digital signal processing (DSP) processor, an integrated circuit, a field programmable gate array (FPGA), a reconfigurable processor or any combination thereof.

Memory 704 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 706 enables the data centre 200 to interconnect with one or more input devices, such as a keyboard, mouse, camera, touch screen and a microphone, or with one or more output devices such as a display screen and a speaker.

Each network interface 708 enables the data centre 200 to communicate with other components, to exchange data with other components, to access and connect to network resources, to serve applications, and perform other computing applications by connecting to a network (or multiple networks) capable of carrying data.

The data centre 200 is operable to register and authenticate users (using a login, unique identifier, and password for example) prior to providing access to applications, a local network, network resources, other networks and network security devices. The data centre 200 may serve one user or multiple users. The authentication data can be stored as access credentials 412.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for a distributed memory data repository with load balancing for request processing, the system comprising a plurality of data centres and a repository switch for loading balancing connected by a network, each of the plurality of data centres having a node to provide the distributed memory data repository across a plurality of nodes, wherein the repository switch for load balancing routes data requests and data traffic to the plurality of data centres, wherein the repository switch for loading balancing selects a first data centre of the plurality of data centres and routes a first data request to the first data centre for verification, the first data centre comprising a node, a processor, a switch and a memory, the switch for routing the first data request to the node of the first data centre, the memory having a data repository that is part of the distributed memory data repository, wherein the data repository stores data to support a distributed defense system for the distributed memory data repository to enable deployment of restoration support across the plurality of data centres, wherein the distributed defense system is configured to run independently on the node leveraging the memory for data storage and implementing a communication channel to interface with the plurality of nodes, the processor configured to execute machine readable instructions stored in the memory to control the node to verify the first data request using the data repository, send a verification response to the switch for provision to the repository switch, and, only upon verification of the first data request, execute the first data request;
wherein the repository switch for load balancing receives load data for the plurality of data centres in real-time and selects the first data centre from the plurality of data centres using the load data indicating current usage for the plurality of data centres;
wherein the load balancing by the repository switch applies to the data requests and the data traffic to ensure distribution of the data requests and the data traffic across the plurality of data centres, wherein the data traffic comprises at least one of sending data and receiving data.

2. The distributed memory data repository of claim 1, wherein the first data centre connects with an interface application to configure load balancing rules.

3. The distributed memory data repository of claim 1, wherein the first data request comprises access credentials, wherein the node verifies the first data request by processing the access credentials using stored access credentials at the memory.

4. The distributed memory data repository of claim 3, wherein upon the access credentials not being verified at the first data centre, the repository switch being configured to re-route the first data request to a second data centre of the plurality of data centres for verification using other stored access credentials at the second data centre.

5. The distributed memory data repository of claim 1, wherein the repository switch is configured to route a second data request to a second data centre of the plurality of data centres for verification, the second data centre comprising a node, a processor, a switch and a memory, the switch for routing the first data request to the node, the memory having a data repository, the processor configured to execute machine readable instructions stored in the memory to control the node to verify the second data request using the data repository and, upon verification, execute the second data request.

6. The distributed memory data repository of claim 1, wherein, upon verification of the first data request by the first data centre, the repository switch is configured to route data traffic to the first data centre for storage and processing.

7. The distributed memory data repository of claim 6, wherein the first data centre is configured to route the data traffic to a second data centre for storage and processing.

8. The distributed memory data repository of claim 1, wherein the processor of the first data centre is configured to transmit a synchronization request to the repository switch to update the data repository with data stored at the plurality of data centres.

9. The distributed memory data repository of claim 1, wherein the repository switch is configured to transmit synchronization requests to the plurality of data centres to update the data repository with data stored at the plurality of data centres.

10. The distributed memory data repository of claim 1 wherein the repository switch is configured with rules for processing network traffic for routing to the first data centre.

11. The distributed memory data repository of claim 1, wherein the repository switch is configured to receive updated data and systematically distributed the updated data to the plurality of data centres.

12. The distributed memory data repository of claim 1, wherein the repository switch is configured to receive a repository deficiency notification from a requesting data centre, and route the repository deficiency notification to the first data centre to trigger a fail-safe mode for the requesting data centre.

13. The distributed memory data repository of claim 1, wherein the repository switch is configured to systematically detect repository deficiencies of any of the plurality of data centres and delegate a defense process to another data centre for a requesting data centre, the defense process to systematically enter a fail-safe allow all mode in response to the detected repository deficiencies.

14. The distributed memory data repository of claim 1, wherein the processor is configured to control the node to implement packet inspection for a fast evolving attack pattern, and share packet inspection notifications across the plurality of data centres for global protection.

15. The distributed memory data repository of claim 1, wherein the repository switch is configured to enable an administrator device to enable and disable a defense system rapidly across all nodes.

16. The distributed memory data repository of claim 1, wherein the repository switch is configured to implement a monitoring only mode by which all detective and self-capability features are active and a defense blocking mode is not operational.

17. The distributed memory data repository of claim 1, wherein the repository switch is configured to route the first data request to the first data centre using a sequence of data centres.

18. The distributed memory data repository of claim 1, wherein the first data centre is configured to transmit a data restoration request to the repository switch, the repository switch being configured to route the data restoration request to a second data centre, the second data centre being configured to transmit data to the first data centre in response to restore the data repository.

19. The distributed memory data repository of claim 1, wherein the node is configured to maintain an audit record of data requests using activity records that indicate verified requests and unverified requests, wherein the node is configured to verify the first data request using the audit record.

20. The distributed memory data repository of claim 1, wherein the first data centre has a plurality of nodes, wherein the first data centre routes the first data request across the plurality of node for internal load balancing using the switch of the first data centre.

21. A process for a distributed memory data repository of a plurality of data centres and a repository switch for loading balancing connected by a network, each of the plurality of data centres having a node and memory to distribute the distributed memory data repository across a plurality of nodes, wherein the repository switch for load balancing routes data requests and data traffic to the plurality of data centres, the process comprising:
   collect load data for the plurality of data centres in real-time, the load data indicating current usage for the plurality of data centres;
   load balance data requests and data traffic by using the repository switch to select a first data centre from the plurality of data centres using the load data indicating current usage for the plurality of data centres collected in real-time, wherein the load balancing by using the repository switch applies to the data requests and the data traffic to ensure distribution of the data requests and the data traffic across the plurality of data centres, wherein the data traffic comprises at least one of sending data and receiving data;
   routing, using the repository switch, a first data request to the first data centre selected using the load data for verification, the first data centre comprising a node, a processor, a switch and a memory having a data repository that is part of the distributed memory data repository, wherein the data repository stores data to support a distributed defense system for the distributed memory data repository to enable deployment of restoration support across the plurality of data centres, wherein the distributed defense system is configured to run independently on the node leveraging the memory for data storage and implementing a communication channel to interface with the plurality of nodes;
   routing the first data request to the node of the first data centre using the switch;
   controlling the node using the processor to verify the first data request using the data repository of the memory and send a verification response to the switch for provision to the repository switch;
   only upon verification, routing the first data request using the processor to another computer resource.

22. The process of claim 21 further comprising: upon the first data request not being verified at the first data centre, re-routing, using the repository switch, the first data request to a second data centre of the plurality of data centres for verification at the second data centre.

23. A process for a distributed memory data repository of a plurality of data centres and a repository switch connected by a network, each of the plurality of data centres having a node and memory to distribute the distributed memory data repository across a plurality of nodes, wherein the repository switch for load balancing routes data requests and data traffic to the plurality of data centres, the process comprising:
   collecting load data for the plurality of data centres in real-time, the load data indicating current usage for the plurality of data centres;
   load balancing of data requests and data traffic, using the repository switch, to select a first data centre from the plurality of data centres using load data indicating current usage for the plurality of data centres collected in real-time, wherein the load balancing applies to the data requests and the data traffic to ensure distribution of the data requests and the data traffic across the plurality of data centres, wherein the data traffic comprises at least one of sending data and receiving data;
   routing, using the repository switch, a first data request to the first data centre selected using the load data for verification of the first data, the first data centre comprising a node, a processor, a switch and a memory having a data repository that is part of the distributed memory data repository, wherein the data repository stores data to support a distributed defense system for the distributed memory data repository to enable deployment of restoration support across the plurality of data centres, wherein the distributed defense system is configured to run independently on the node leveraging the memory for data storage and implementing a communication channel to interface with the plurality of nodes;
   routing the first data request to the node using the switch;
   controlling the node using the processor to perform the pre-authentication validation of the first data request using the data repository of the memory;
   only upon verification of the first data request by the node, routing the first data request to another computer resource using the repository switch; and
   upon the first data request not being verified at the first data centre, re-routing the first data request to a second data centre of the plurality of data centres.

24. The distributed memory data repository of claim 23, wherein the first data request is routed to different nodes to load balance by the switch of the first data centre and the repository switch.

* * * * *